Dec. 1, 1953 S. DUBIN ET AL 2,660,823
TIRE DISPLAY
Filed Oct. 20, 1951

INVENTORS
SERROL DUBIN
BY JOSEPH GOLDBERG

ATTORNEYS

Patented Dec. 1, 1953

2,660,823

UNITED STATES PATENT OFFICE 2,660,823

TIRE DISPLAY

Serrol Dubin and Joseph Goldberg, Cleveland, Ohio

Application October 20, 1951, Serial No. 252,386

3 Claims. (Cl. 40—125)

This invention relates to advertising or display devices, and it particularly relates to a display device suited for use with conventional pneumatic tire, or the like.

Everyone knows that countless gas stations are to-day involved in the retailing of many items in addition to gasolene. Nearly all of such thousands of gas stations are engaged in the business of selling pneumatic tires, or else they at least have a tire position around the premises for repair or display purposes. Accordingly, such tires are ideal stands or apparatus for use in advertising products sold by such gas stations. Thus in the past various efforts have been made to provide displays for use with pneumatic tires and some prior structures of this type have been proposed.

In placing advertisements or other data in the pneumatic tire, it has been difficult to engage the advertisement sufficiently securely in the tire so as to prevent its ready removal from the tire by a gust of wind, or by accidental forces applied thereto. Also some displays have been hard to position in a tire, or the display may easily be damaged when being placed in engagement with a tire.

It is the general object of the present invention to provide a new and improved display for use with pneumatic tires, which display is characterized by its ready but sturdy engagement with a tire.

Another object of the invention is to provide a display especially adapted for convenient engagement with a pneumatic tire, which display comprises two parts, both made from lightweight cardboard material.

Yet another object of the invention is to provide a display of the class described which is adapted to provide a three dimensional appearance in the display.

Yet another object of the invention is to provide a low cost display which has a novel and attractive appearance.

The foregoing and other objects and advantages of the specification will be made more apparent as the specification proceeds.

Reference now should be had to the accompanying drawings, wherein.

Figure 1:
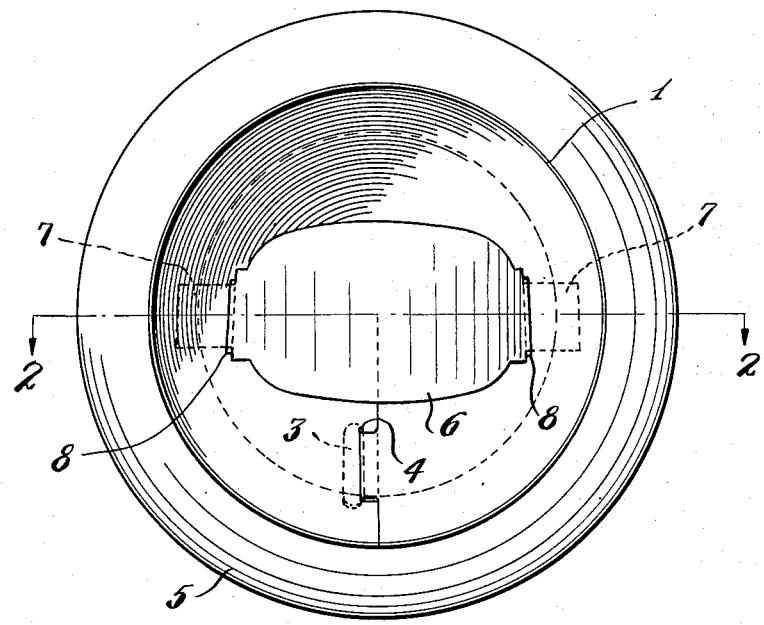
Fig. 1 is an elevation of one embodiment of the invention.

The present invention, broadly speaking, resides in a display which is made from two pieces one of which is of the shape of a substantial flat or shallow conical member that engages the outer surface of a side wall portion of a pneumatic tire and which is adapted to have its apex project into the open center of the tire, and the second component of the display is a flexible lock strip which extends through spaced portions of the conical member for engaging an inner part of the tire to secure the display thereto by resilient engagement of opposite surfaces of one portion of the tire.

The display of the invention may be made from any suitable material, although normally the display is made from relatively light-weight cardboard of a conventional composition. Obviously any desired advertising data may be printed, stencilled, lithographed or otherwise affixed on the face of the display.

The details of the structure shown on the drawing specifically include a backing member 1 that is normally of circular shape and which usually has a wedge shaped opening or recess 2 provided in the one peripheral portion of the backing member 1. A locking tab 3 usually is provided on one edge of the recess 2 and protrudes thereinto for engagement with a slot 4 formed in the member 1 adjacent an opposed margin of the recess 2. Thus the tab 3 can be easily engaged with the slot 4 by bending or moving the member 1 from flat disc shape over to shallow conical shape and be retained in such position by engaging the tab 3 in the slot 4. In some instances, it may be desirable to secure the member 1 in flat conical shape by other means from that referred to herein, as by making the member 1 with a radial slit therein and securing the edges of the slit in overlapped position by an adhesive, staples or other conventional means.

Figure 2:
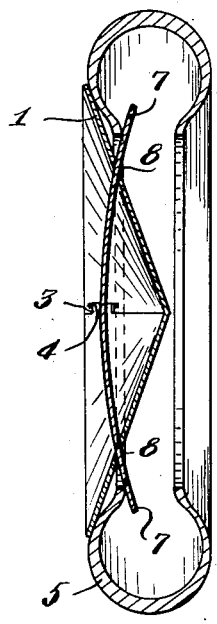
Fig. 2 is a horizontal section taken on line 2—2 of Fig. 1.
Figure 3:
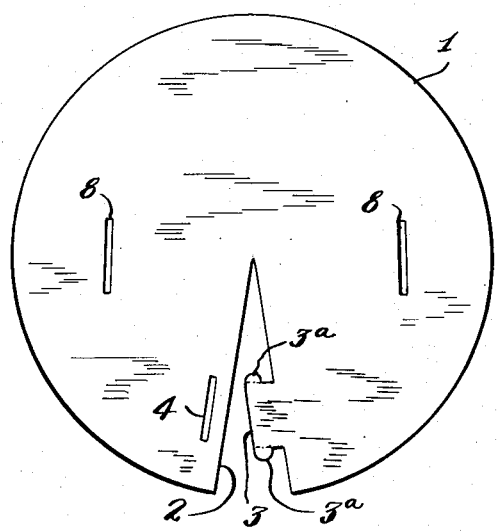
Fig. 3 is an elevation of the disc of Fig. 1 when flattened out.

The backing member 1 is adapted to engage with a conventional pneumatic tire 5 on one side wall portion thereof, as best indicated in Fig. 2, with the apex of the conical member protruding into the open center of the tire.

Such backing member 1 is resiliently secured to the tire 5 by means of a suitable cardboard lock strip or locking member 6 which usually has reduced width end portions 7 provided thereon. The end portions 7 are adapted to engage with and extend through a pair of usually diametrically opposed slots 8 also formed in the backing 7 at desired opposed portions thereof usually circumferentially spaced from the recess 2. This locking strip 6 is of sufficiently resilient construction, as is the member 1, to grasp the opposed portions of the tire 5 positioned between the edge portions of such members 1 and 6 and resiliently and tightly hold the display of the invention in engagement with the tire 5.

Fig. 2 best indicates the three-dimensional effect produced in the display of the invention by the locking member 6.

In some instances, it may be desirable to use some type of a flat disc in place of the conical backing member 1 in a modified display of the invention.

The end portions of the locking tab 3, indicated at 3ª, can be bent out substantially normal to the remainder of the tab to bear on the adjacent surface of the member 1 at the slot 4 after the locking tab 3 is inserted through the slot 4. This makes the display assembly a bit more solid and facilitates inserting the locking tab 3 through the slot 4 because by bending the end portions 3ª out of the plane of the locking tab 3, the slot 4 can be as wide as the widest part of the locking tab 3 in its flat shape. The locking tab would then be retained in locked position by the bent over end portions 3ª. Of course, the locking tab 3 normally is integral with the backing member 1.

It should be noted that the display of the invention can be used in a tube as well as in a tire. In a tube the end portions 7 may be slightly longer than those shown so that they resiliently engage an opposite surface of the tube to that surface contacted by the backing member 1.

It will be realized that the display of the invention is of inexpensive construction and yet it can be easily engaged with a pneumatic tire without any damage to the display by such engagement. Accordingly the display can be readily engaged with a tire but yet be firmly locked thereto for display purposes so that the objects of the invention are achieved.

While one complete embodiment of the invention has been disclosed herein, it will be appreciated that modification of this particular embodiment of the invention may be resorted to without departing from the scope of the invention as defined by the appended claims.

Having thus described the invention, what we claim is:

1. A display comprising a conical member having a continuous periphery and having a pair of diametrically opposed slots therein spaced radially inwardly from the periphery thereof, said member being adapted to engage one side of an annular member and protrude into the open center thereof, and a flexible narrow elongate strip the end portions of which are of reduced width and extend through said diametrically opposed slots and protrude from such slots for securing the strip to said member and for engaging the opposite side of an annular member to secure the display thereto.

2. In combination, a pneumatic tire, a thin substantially flat flexible conical member engaging the outer surface of said tire with its apex projecting into the open center of said tire, and a flexible cardboard lock strip extending through slots in spaced portions of said member to engage the inner surface of said tire and secure the conical member thereto, said lock strip bridging over and being spaced from the apex of said conical member at the front of the conical member, the front portions of said lock strip and said conical member being adapted to receive any desired advertising data thereon.

3. In combination, an annular member, a thin substantially flat continuous periphery conical member engaging one side wall portion of said annular member with its apex projecting into the open center of said annular member, and a flexible lock strip engaging spaced portions of said conical member and extending therethrough to engage the other surface of said annular member, said lock strip bridging over and being spaced from the apex of said conical member.

SERROL DUBIN.
JOSEPH GOLDBERG.

References Cited in the file of this patent

UNITED STATES PATENTS

| Number | Name | Date |
|---|---|---|
| 1,758,307 | Bales | May 13, 1930 |
| 1,809,298 | Heywood | June 9, 1931 |
| 2,503,988 | Arbib | Apr. 11, 1950 |